United States Patent
Vacquerie et al.

(10) Patent No.: US 12,267,581 B2
(45) Date of Patent: Apr. 1, 2025

(54) BOOT SEQUENCE IN COLD TEMPERATURES

(71) Applicant: GoPro, Inc., San Mateo, CA (US)

(72) Inventors: Vincent Vacquerie, Longnes (FR); Stéphane Belardi, Meudon (FR)

(73) Assignee: GoPro, Inc., San Mateo, CA (US)

( * ) Notice: Subject to any disclaimer, the term of this patent is extended or adjusted under 35 U.S.C. 154(b) by 117 days.

(21) Appl. No.: 18/108,249

(22) Filed: Feb. 10, 2023

(65) Prior Publication Data
US 2023/0283891 A1 Sep. 7, 2023

Related U.S. Application Data

(60) Provisional application No. 63/315,531, filed on Mar. 1, 2022.

(51) Int. Cl.
| | |
|---|---|
| *H04N 23/65* | (2023.01) |
| *G06F 1/3206* | (2019.01) |
| *G06F 1/324* | (2019.01) |
| *G06F 1/3296* | (2019.01) |
| *H04N 23/52* | (2023.01) |

(52) U.S. Cl.
CPC ......... *H04N 23/651* (2023.01); *G06F 1/3206* (2013.01); *G06F 1/324* (2013.01); *G06F 1/3296* (2013.01); *H04N 23/52* (2023.01)

(58) Field of Classification Search
CPC ...... H04N 23/651; H04N 23/52; H04N 23/60; G06F 1/3206; G06F 1/324; G06F 1/3296; G06F 1/1626; G06F 1/1635; G06F 1/165; G06F 1/1656; G06F 1/1686; G06F 1/206; G06F 1/3237; Y02D 10/00
See application file for complete search history.

(56) References Cited

U.S. PATENT DOCUMENTS

| | | | |
|---|---|---|---|
| 7,467,318 B2 * | 12/2008 | Bruno | G06F 1/206 713/322 |
| 10,001,800 B1 * | 6/2018 | Takayanagi | G05F 3/02 |
| 2008/0001634 A1 * | 1/2008 | Arabi | G06F 9/3885 326/99 |
| 2023/0031415 A1 * | 2/2023 | Rajwan | G06F 11/3058 |

* cited by examiner

*Primary Examiner* — Padma Haliyur
(74) *Attorney, Agent, or Firm* — Young Basile Hanlon & MacFarlane, P.C.

(57) ABSTRACT

Systems and methods are disclosed for boot sequences in cold temperatures. For example, methods may include accessing a temperature measurement from a temperature sensor; responsive to the temperature measurement being below a threshold, setting a clock frequency for a clock signal used by an integrated circuit to a first frequency; and executing boot code in the integrated circuit using the clock signal at the first frequency, wherein the first frequency is lower than a second frequency that the integrated circuit is configured to use when executing the boot code at higher temperatures. In some implementations, an idle mode is used to heat up a device to achieve a temperature needed to support a use case for the device.

20 Claims, 10 Drawing Sheets

BOOT SEQUENCE IN COLD TEMPERATURES

CROSS-REFERENCE TO RELATED APPLICATION(S)

This application claims priority to and the benefit of U.S. Provisional Application Patent Ser. No. 63/315,531, filed Mar. 1, 2022, the entire disclosure of which is hereby incorporated by reference.

TECHNICAL FIELD

This disclosure relates to boot sequences for cold temperatures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A faster boot sequence of a camera may improve a user experience when the user is pressing the shutter bottom to start recording. But in some circumstances, when internal device temperature is very low (e.g., below 0° C.), it may happen that the device may not be able to boot or to start recording because the battery is not able to deliver enough power to the system to run properly. In such circumstances, a modified boot sequence may be employed to make do with lower power available from the battery until the battery heats up.

In some implementations, a boot sequence starts by enabling functions gradually in the system at a rate that is a function of the temperature of the battery, to reach a common state of the device, named the idle state. Second, when in the idle state, the process continues by running a sequence that will increase the internal temperature of the device since the components of the camera are going to be activated gradually and therefore dissipate some heat. By doing so, the battery temperature may be increased. When the internal battery temperature reaches a given value, the battery will be able to deliver enough power for tasks to be executed. In some implementations, a characterization of power to be delivered per camera use case may be used to allow for reduction of the warm-up sequence time, for example, as some use cases require less power.

A system may be configured to smooth power demand during the boot sequence. For example, a boot sequence of a system (e.g., a camera) may be controlled by two components, a microcontroller (MCU) and a system-on-a-chip (SoC). The MCU may perform a basic check to ensure that a power management integrated circuit (PMIC) is operational. The PMIC is a component that transforms the voltage delivered by the battery into several low voltage values required by the various integrated circuits of the system, such as DRAM, display, image sensors, and Embedded Multi Media Card (eMMC), for example. After the MCU performs a basic check, then the SoC will boot.

Figure 8:
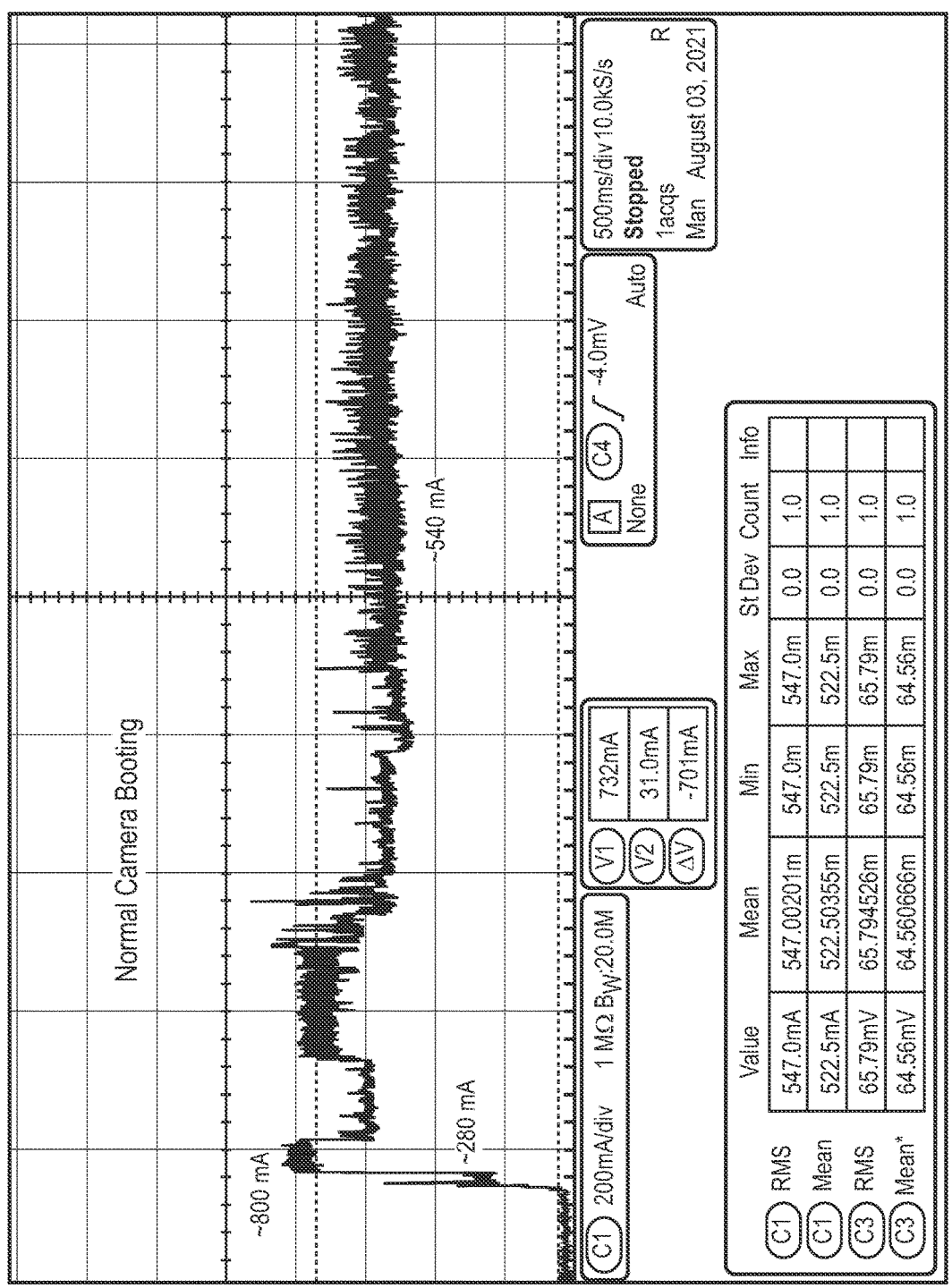
FIG. 8 is a graph illustrating an example of current draw by an integrated circuit during execution of a boot sequence.

For example, FIG. 8 illustrates an overall current, delivered by the battery, during a boot sequence for an SoC. To ensure a safe boot sequence, the temperature of the battery may be measured. When the temperature measured is below a given threshold (e.g., below 0° C.), the boot sequence may be performed gradually, with special care. Special boot sequences for use in cold conditions may include one or more aspects listed below.

1) In some implementations, a boot sequence may optionally avoid enabling per domain power supplies that are not necessary when a cold condition is detected. For example, an MCU may be configured to selectively enable power domains in a device based on one or more temperature measurements.

2) In some implementations, when the SoC is under reset, special care may be used during SoC design to reduce power consumption, such as by reducing a number of registers that need to be enabled under a reset condition, and/or by activating clock gaters to minimize clock tree power consumption since some data paths may be not functional in this particular state or use case.

3) In some implementations, a bootup sequence (e.g., a phase during which the bootstrap of the eMMC is loaded into internal SRAM) may be performed in a degraded mode, such as by increasing time for bootup in exchange for reduction of peak current drawn.

4) In some implementations, a clock frequency used to run boot code is set based on one or more temperature measurements. For example, all clocks in a system may be set to their minimal values of frequency (i.e., values less than expected during a normal boot sequence) when a cold temperature below a predetermined threshold is detected.

5) In some implementations, Automatic Voltage Scaling (AVS) may be applied early in a boot sequence. The application of AVS may allow control of voltage of a digital domain of the SoC that can support voltage adaptation based on intrinsic SoC characteristic (e.g., internal speed).

6) In some implementations, a boot sequence may be adjusted to avoid parallel actions. For instance, if the SoC is populated with several DDR channels, each channel can be configured to perform its own training sequence in parallel. When a low temperature condition is detected, all DDR channel training sequences can be performed in a serial mode to spread out or spread apart in time the value of current drawn.

7) In some implementations, code transfer from the eMMC (e.g., the non-volatile storage) to the DDR (e.g., the volatile storage) may be slowed down to spread out or spread apart in time the value of current drawn.

8) In some implementations, when an idle state of a system (e.g., the camera) is reached, all clocks can be set to their nominal value.

An idle state of a camera may be used to warm the camera to run a requested camera use case once a temperature (e.g., a temperature of a battery) reaches a threshold required for robust performance in the use case. A battery may be able to deliver a given amount of power depending on its own temperature. So, to run a specific use case for the camera, the internal battery temperature must be above a minimal or minimum threshold value in order to safely and reliably deliver enough power. To do so, a software sequence can be run until the minimal temperature of the battery has been reached. The software sequence may be designed in order to safely increase power consumption, leading to increased heat dissipation by components, leading to internal body temperature increase, and therefore to battery temperature increase.

Figure 1A:
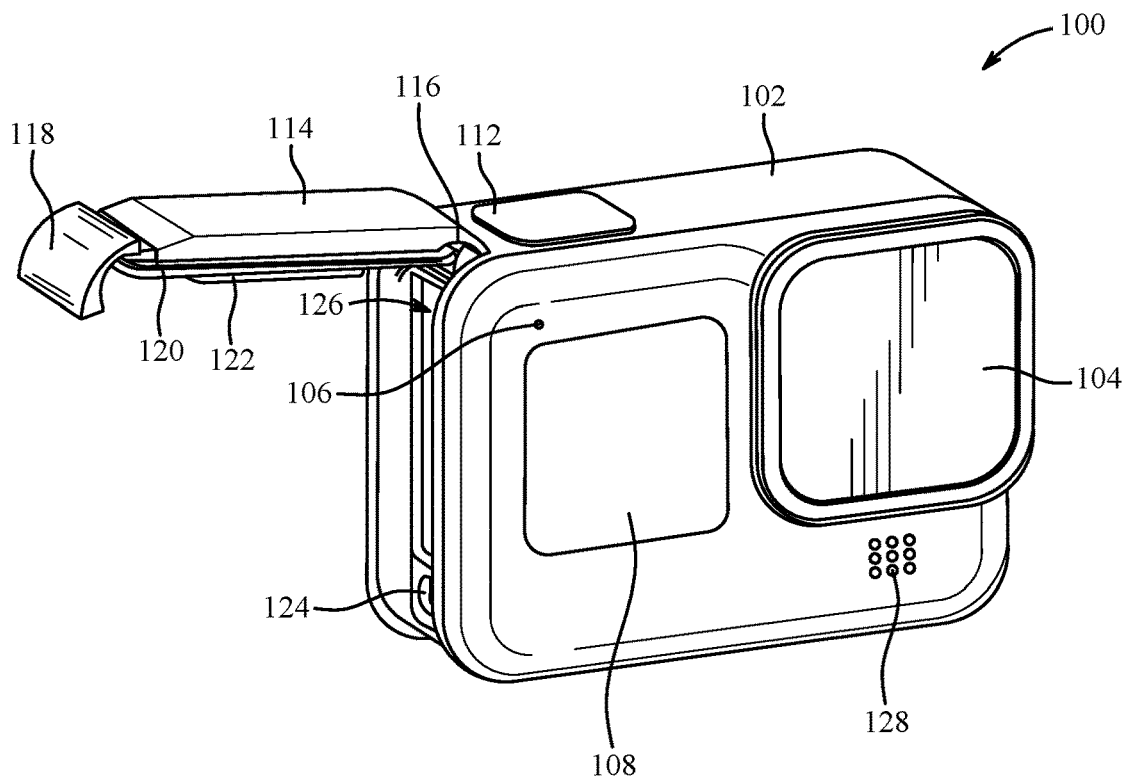
FIGS. 1A-B are isometric views of an example of an image capture device.
Figure 1B:
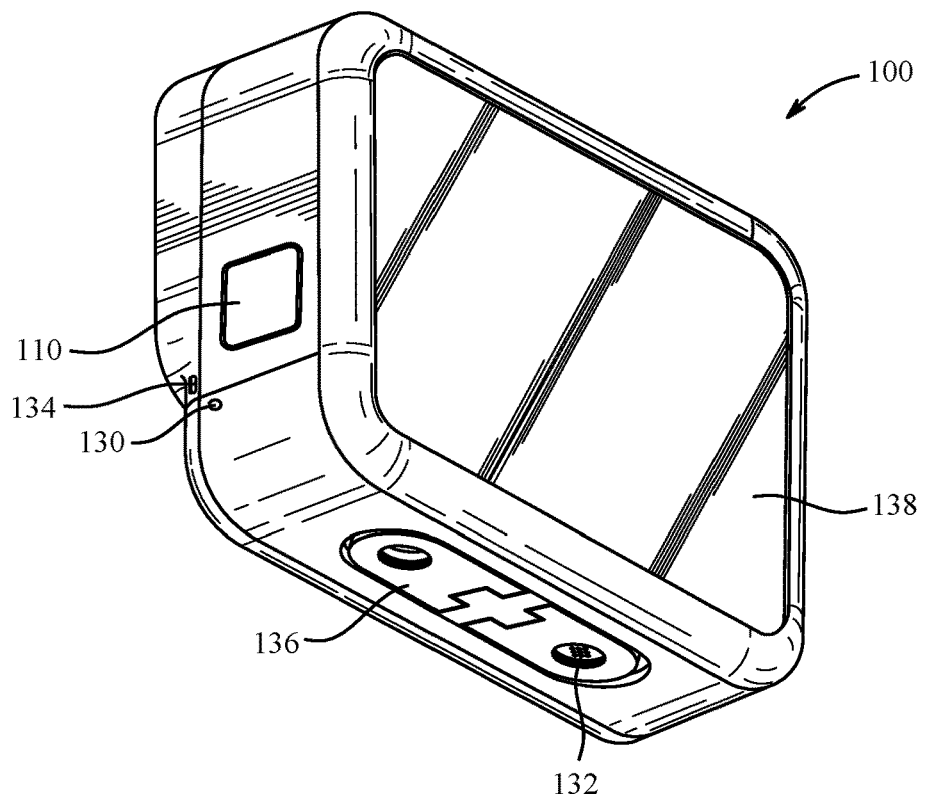

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 5:
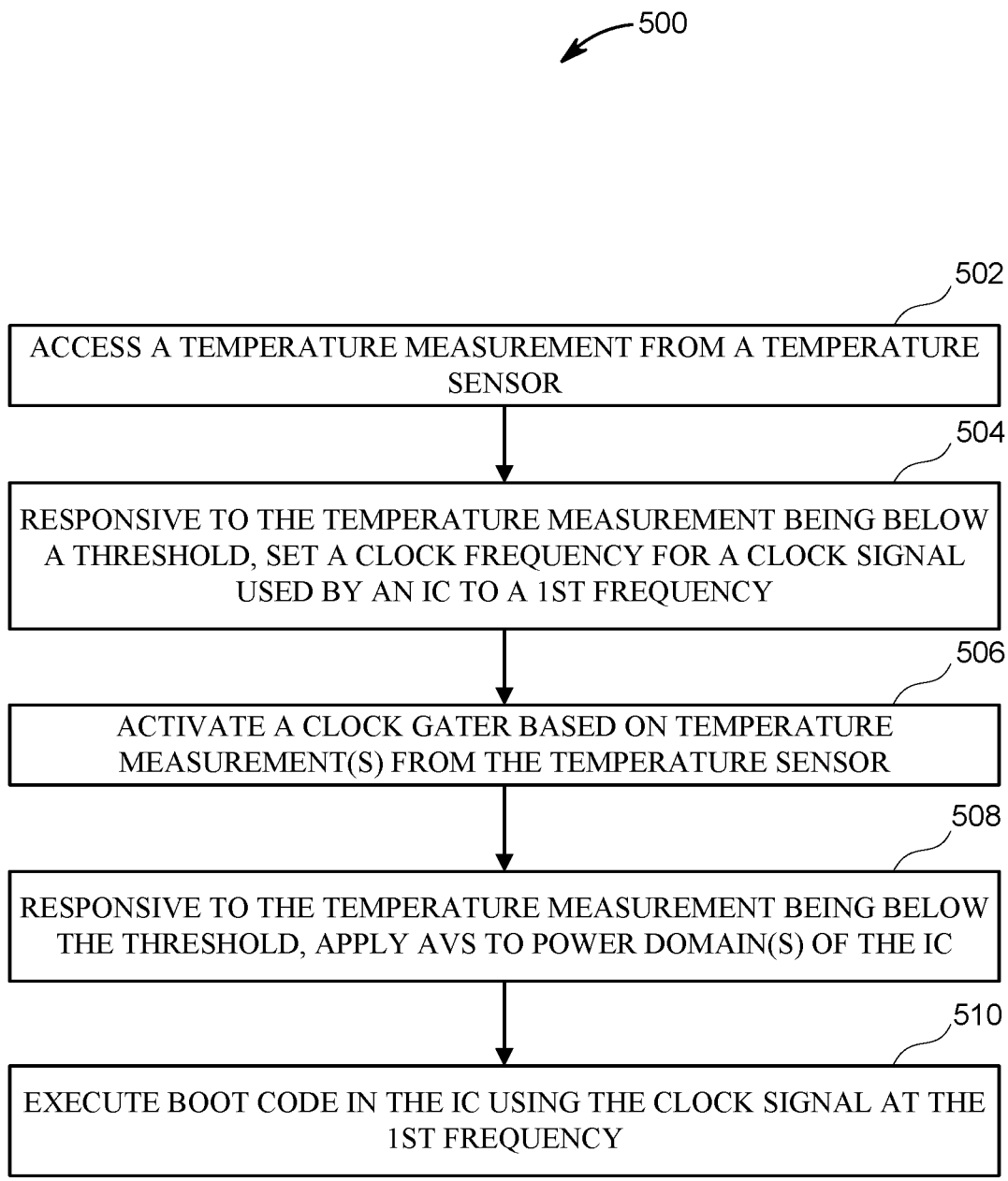
FIG. 5 is a flowchart of an example of a technique for booting at low temperature.
Figure 6:
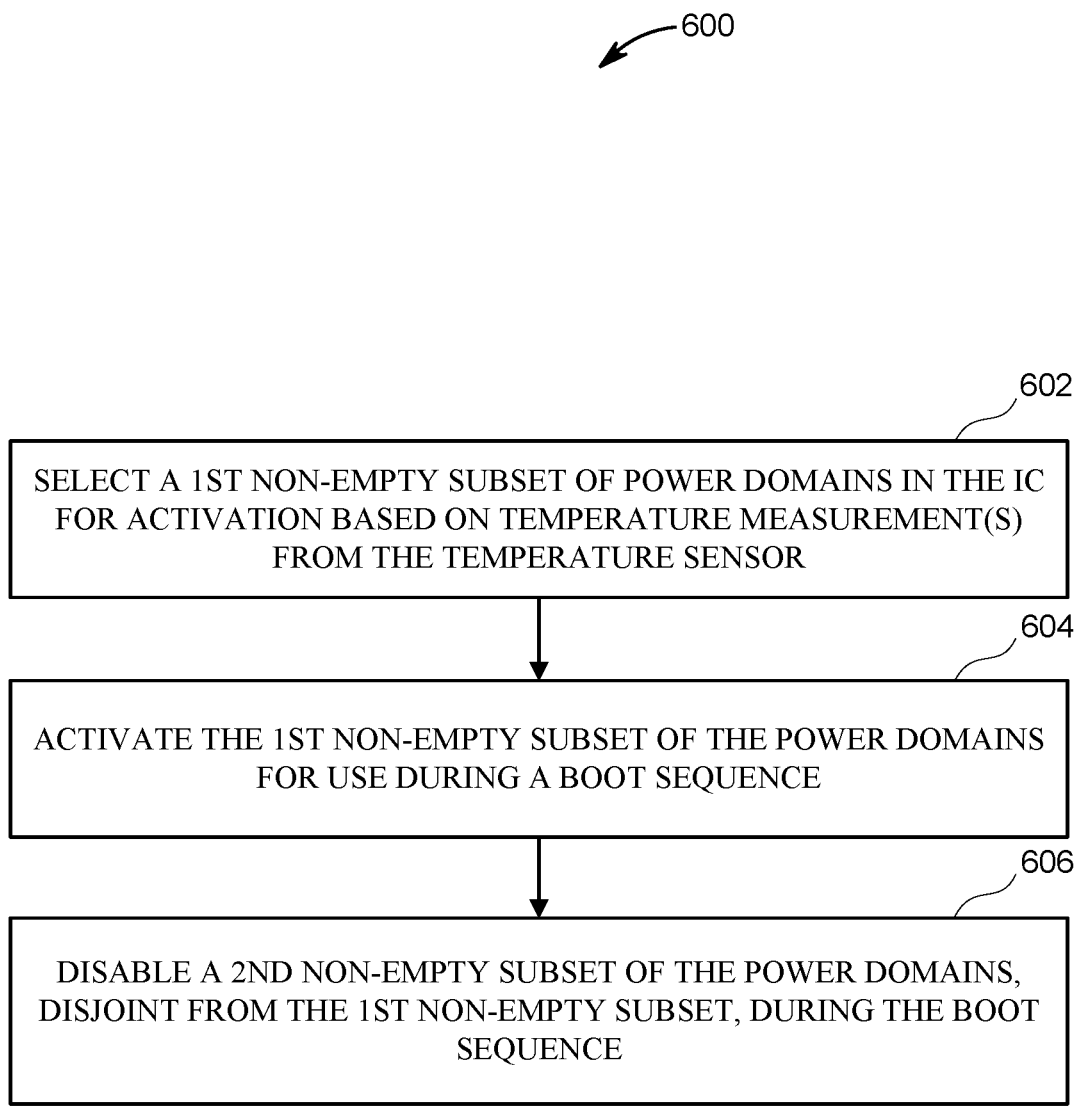
FIG. 6 is a flowchart of an example of a technique for booting at low temperature.
Figure 7:
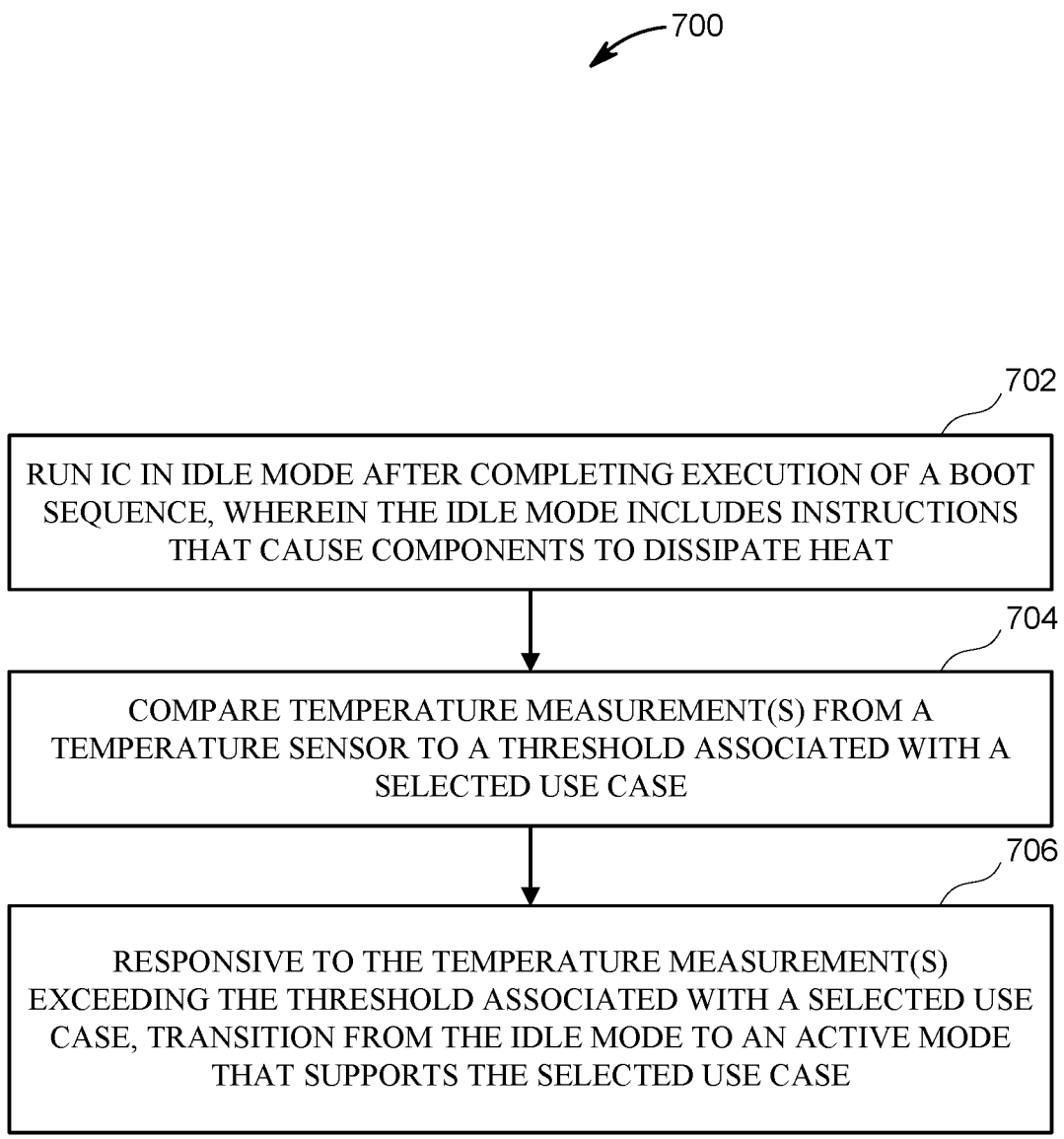
FIG. 7 is a flowchart of an example of a technique for warming up an image capture device from a low temperature using an idle mode to support a use case requiring a higher temperature.

The image capture device 100 may be used to implement some or all of the techniques described in this disclosure, such as the technique 500 described in FIG. 5, the technique 600 described in FIG. 6, and/or the technique 700 described in FIG. 7.

Figure 2A:
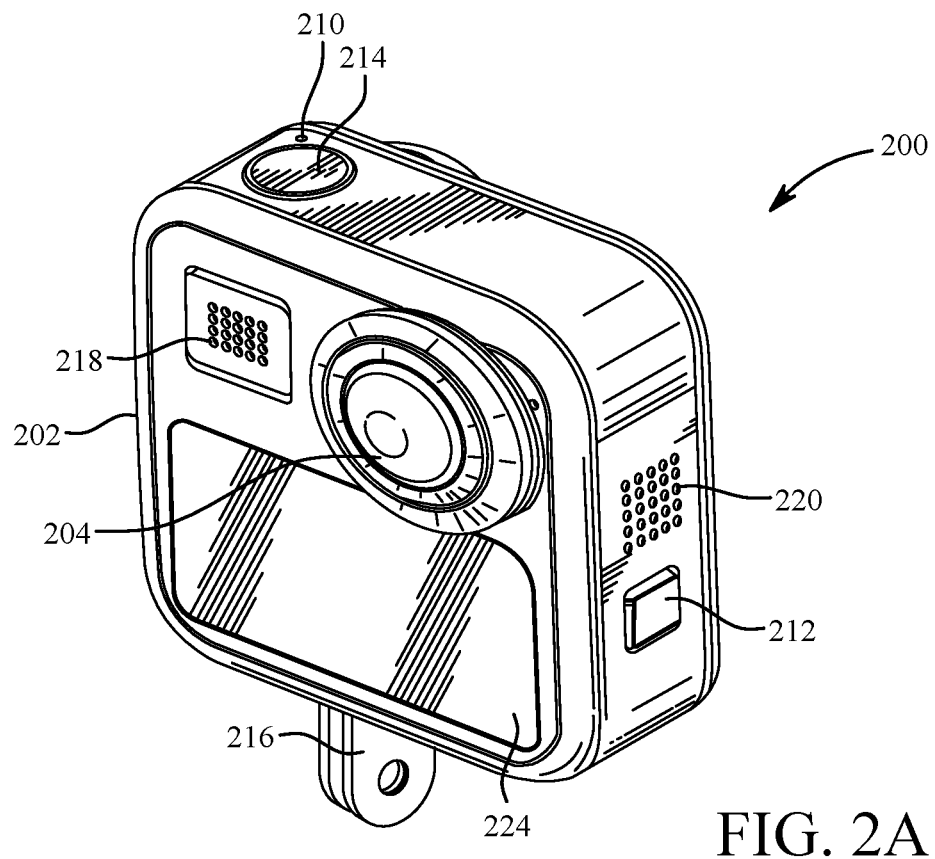
FIGS. 2A-B are isometric views of another example of an image capture device.
Figure 2B:
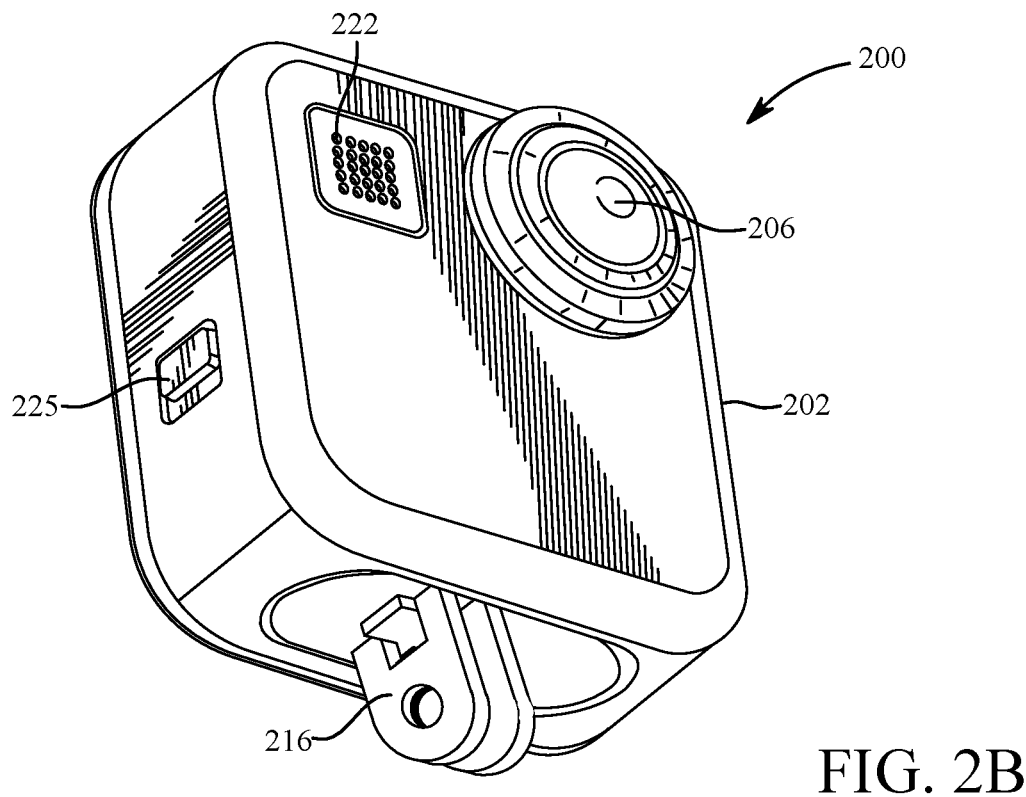

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
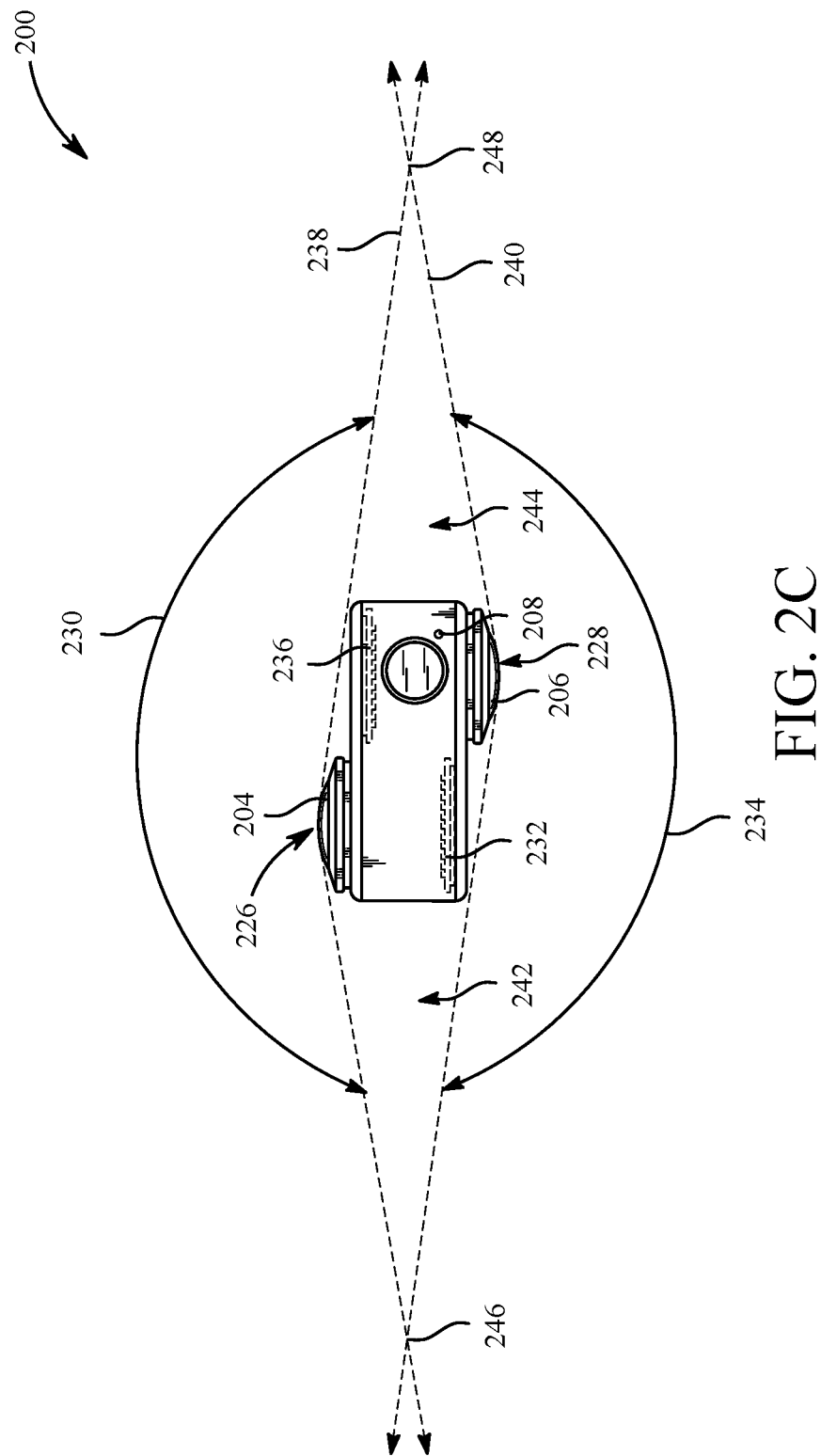
FIG. 2C is a top view of the image capture device of FIGS. 2A-B.
Figure 2D:
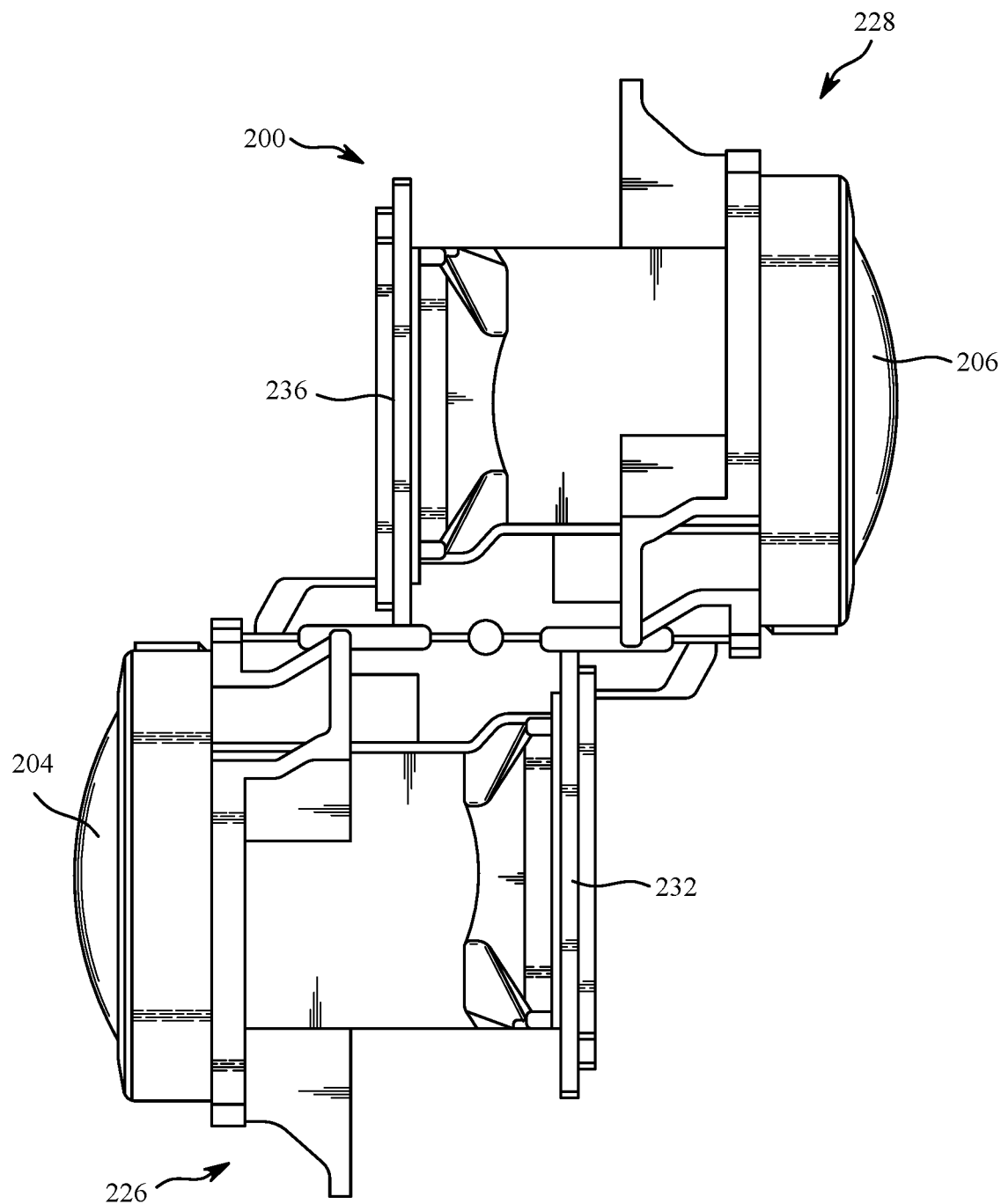
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the techniques described in this disclosure, such as the technique 500 described in FIG. 5, the technique 600 described in FIG. 6, and/or the technique 700 described in FIG. 7.

Figure 3:
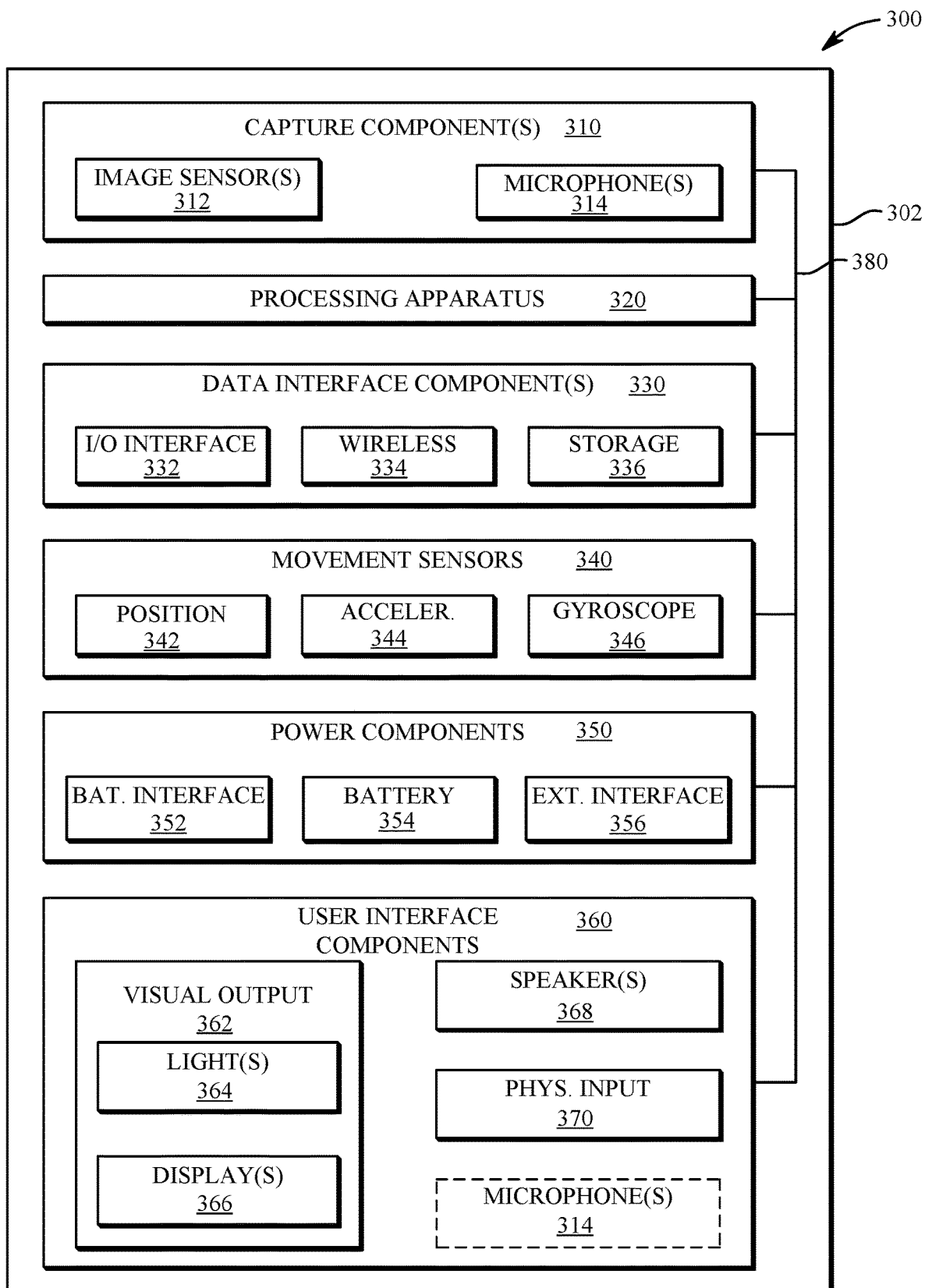
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the technique 500 described in FIG. 5, the technique 600 described in FIG. 6, and/or the technique 700 described in FIG. 7.

Figure 4:
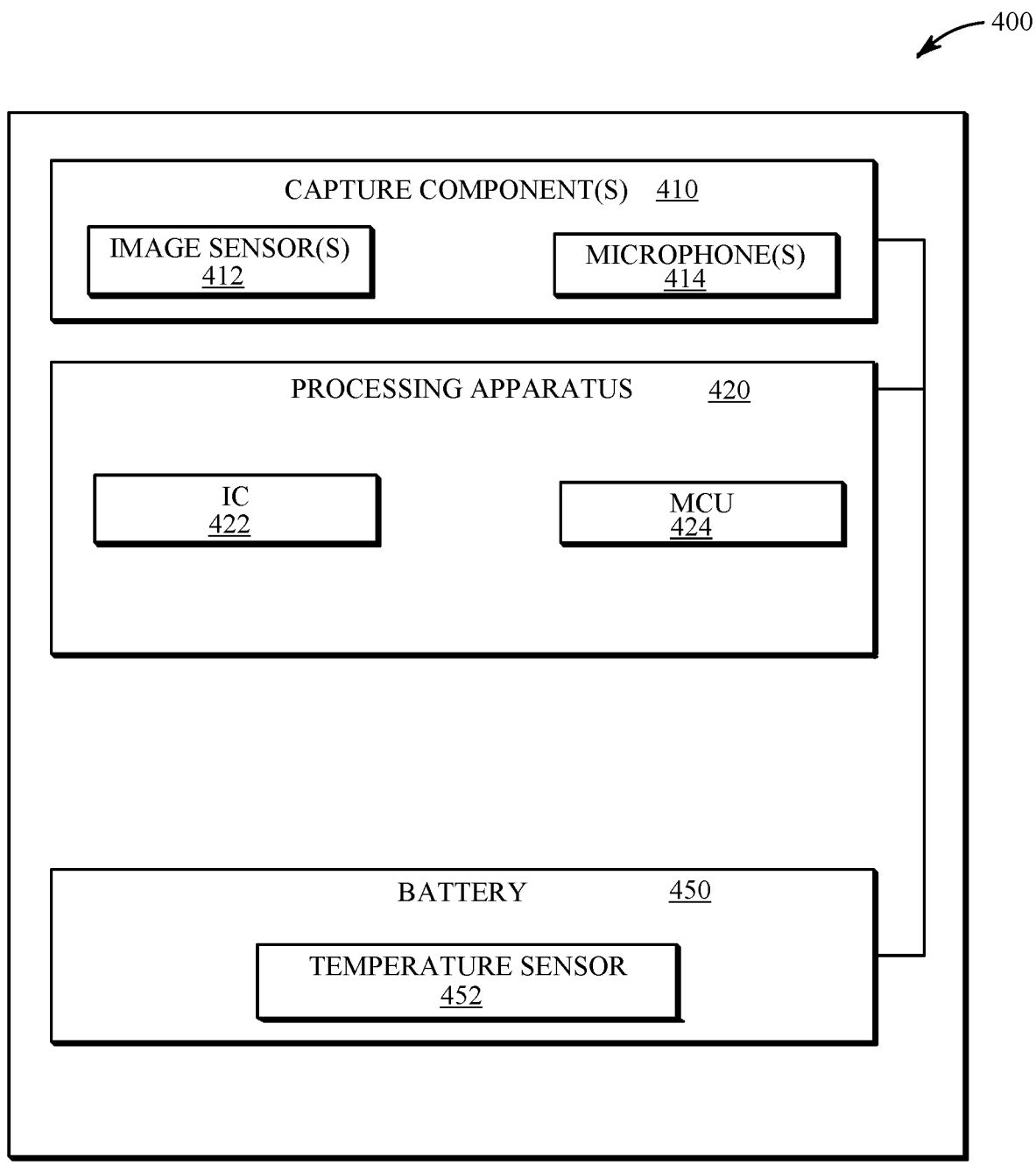
FIG. 4 is a block diagram of electronic components of an image capture device configured to adjust a boot sequence based on a temperature of the image capture device.

FIG. 4 is a block diagram of electronic components of an image capture device 400 configured to adjust a boot sequence based on a temperature of the image capture device. The image capture device 400 includes capture components 410, including one or more image sensors 412 and one or more microphones 414; a processing apparatus 420 including an integrated circuit (IC) 422 and a microcontroller (MCU) 424; a battery 450; and a temperature sensor 452. For example, the processing apparatus 420 may be configured to access a temperature measurement from the temperature sensor 452, and responsive to the temperature measurement being below a threshold, set a clock frequency for a clock signal used by an integrated circuit, e.g., the integrated circuit 422, to a first frequency. The processing apparatus 420 may be configured to execute boot code in the integrated circuit 422 using the clock signal at the first frequency. The first frequency may be lower than a second frequency that the integrated circuit 422 is configured to use when executing the boot code at higher temperatures.

The battery 450 is configured to provide power to the processing apparatus 420. In this example, the temperature sensor 452 is integrated with or within the battery 450. In some implementations, the temperature sensor 452 may be positioned elsewhere in the image capture device 400, for example, outside of the battery 450.

In this example, the processing apparatus 420 includes the integrated circuit 422 (e.g., a system-on-a-chip (SOC)) and the microcontroller (MCU) 424 that is used to access the temperature measurement from the temperature sensor 452 and set the clock frequency for the clock signal. In some implementations, the integrated circuit 422 may be configured to access the temperature measurement and set the clock frequency for the clock signal during an early phase of a boot sequence for the integrated circuit 422.

The integrated circuit 422 may include multiple power domains, and the processing apparatus 420 may be configured to select a first non-empty subset of the power domains in the integrated circuit 422 for activation based on one or more temperature measurements from the temperature sensor 452, activate the first non-empty subset of the power domains for use during a boot sequence, and disable a second non-empty subset of the power domains, disjoint from the first non-empty subset, during the boot sequence.

In some implementations, the processing apparatus 420 is configured to activate a clock gater based on one or more temperature measurements from the temperature sensor 452. In some implementations, the processing apparatus 420 is configured to, responsive to the temperature measurement being below the threshold, apply automatic voltage scaling to one or more power domains of the integrated circuit 422.

The processing apparatus 420 may be configured to run the integrated circuit 422 in an idle mode after completing execution of the boot code. The idle mode includes instructions that cause components of the processing apparatus 420 to dissipate heat, compare one or more temperature measurements from the temperature sensor 452 to a threshold associated with a selected use case, and, responsive to the one or more temperature measurements exceeding the threshold associated with the selected use case, transition from the idle mode to an active mode that supports the selected use case.

FIG. 5 is a flowchart of an example of a technique 500 for booting a device such as a camera or an imaging device at a low temperature. The technique 500 includes accessing 502 a temperature measurement from a temperature sensor; responsive to the temperature measurement being below a threshold, setting 504 a clock frequency for a clock signal used by an integrated circuit to a first frequency; activating 506 a clock gater based on one or more temperature measurements from the temperature sensor; responsive to the one or more temperature measurements being below the threshold, applying 508 automatic voltage scaling to one or more power domains of the integrated circuit; and executing 510 boot code in the integrated circuit using the clock signal at the first frequency. The first frequency may be lower than a second frequency that the integrated circuit is configured to use when executing the boot code at higher temperatures.

In some implementations, the temperature sensor is integrated with a battery. In some implementations, the temperature sensor is disposed inside a camera body with the integrated circuit. In some implementations, the integrated circuit includes multiple power domains and a subset of the power domains may be selected for activation based on the temperature measurement. In some implementations, an idle mode may be used after the boot sequence at low temperature to heat up a device (e.g., the camera or the imaging device) that includes the integrated circuit to achieve a temperature (e.g., a battery temperature) needed to supply current sufficient for a selected use case for the device. The technique 500 of FIG. 5 may be implemented with the technique 600 of FIG. 6 and/or the technique of FIG. 7 described herein.

FIG. 6 is a flowchart of an example of a technique 600 for booting at low temperature. The technique 600 includes selecting 602 a first non-empty subset of the power domains in the integrated circuit for activation based on one or more temperature measurements from the temperature sensor; activating 604 the first non-empty subset of the power domains for use during a boot sequence; and disabling 606 a second non-empty subset of the power domains, disjoint from the first non-empty subset, during the boot sequence. The technique 600 of FIG. 6 may be implemented with the technique 500 of FIG. 5 and/or the technique 700 of FIG. 7 described herein.

FIG. 7 is a flowchart of an example of a technique 700 for warming up a device, such as an image capture device or camera, from a low temperature using an idle mode to support a use case requiring a higher temperature. The technique 700 includes running 702 an integrated circuit in an idle mode after completing execution of boot code, wherein the idle mode includes instructions that cause components to dissipate heat; comparing 704 one or more temperature measurements from a temperature sensor to a threshold associated with a selected use case; and, responsive to the one or more temperature measurements exceeding the threshold associated with the selected use case, transitioning 706 from the idle mode to an active mode that supports the selected use case.

In some implementations, the temperature sensor is integrated with a battery. In some implementations, the temperature sensor is inside an image capture device, such as inside a camera body adjacent to or with the integrated circuit. In some implementations, the integrated circuit includes multiple power domains and a subset of the power domains may be selected for activation based on the one or more temperature measurements. In some implementations, the technique 700 includes, responsive to one or more of the temperature measurements being below a threshold, applying automatic voltage scaling to one or more power domains of the integrated circuit. The technique 700 of FIG. 7 may be implemented with the technique 500 of FIG. 5 and/or the technique 600 of FIG. 6 described herein.

FIG. 8 illustrates a graph 800 of overall current, delivered by a battery, during a normal boot sequence for an SoC of a camera. To execute a boot sequence effectively in cold temperatures, the techniques 500, 600, 700 of FIGS. 5 to 8 may be employed. For example, a temperature of the battery may be measured. When the temperature measured is below a given threshold (e.g., below 0° C.), the boot sequence may be performed gradually, with special care. This gradual boot sequence may occur using a clock signal at a first frequency that is lower than a second frequency used when temperature measurements are above the given threshold. This gradual boot sequence may include running an integrated circuit of the camera in an idle mode after completing execution of boot cod. The idle mode includes instructions that cause components to dissipate heat, thus raising the temperature of the overall device that includes the components. By heating the components, a temperature needed to support a use case for the device, that is, the camera can be achieved.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
a temperature sensor; and
a processing apparatus that is configured to:
access a temperature measurement from the temperature sensor;
responsive to the temperature measurement being below a threshold, set a clock frequency for a clock signal used by an integrated circuit to a first frequency, wherein the integrated circuit includes multiple power domains;
select a first non-empty subset of the power domains in the integrated circuit for activation based on one or more temperature measurements from the temperature sensor;
activate the first non-empty subset of the power domains for use during a boot sequence;
disable a second non-empty subset of the power domains, disjoint from the first non-empty subset, during the boot sequence; and
execute boot code in the integrated circuit using the clock signal at the first frequency, wherein the first frequency is lower than a second frequency that the integrated circuit is configured to use when executing the boot code at temperature measurements above the threshold.

2. The system of claim 1, comprising:
a battery configured to provide power to the processing apparatus, wherein the temperature sensor is integrated with the battery.

3. The system of claim 1, wherein the processing apparatus includes the integrated circuit and a microcontroller that is used to access the temperature measurement and set the clock frequency for the clock signal.

4. The system of claim 1, wherein the processing apparatus includes the integrated circuit and the integrated circuit is configured to access the temperature measurement and set the clock frequency for the clock signal during an early phase of a boot sequence for the integrated circuit.

5. The system of claim 1, wherein the processing apparatus is configured to:
activate a clock gater based on one or more temperature measurements from the temperature sensor.

6. The system of claim 1, wherein the processing apparatus is configured to:
responsive to the temperature measurement being below the threshold, apply automatic voltage scaling to one or more power domains of the integrated circuit.

7. The system of claim 1, wherein the processing apparatus is configured to:
run the integrated circuit in an idle mode after completing execution of the boot code, wherein the idle mode includes instructions that cause components of the processing apparatus to dissipate heat;
compare one or more temperature measurements from the temperature sensor to a threshold associated with a selected use case; and
responsive to the one or more temperature measurements exceeding the threshold associated with the selected use case, transition from the idle mode to an active mode that supports the selected use case.

8. A method comprising:
accessing a temperature measurement from a temperature sensor;
responsive to the temperature measurement being below a threshold, setting a clock frequency for a clock signal used by an integrated circuit to a first frequency, wherein the integrated circuit includes multiple power domains;
selecting a first non-empty subset of the power domains in the integrated circuit for activation based on one or more temperature measurements from the temperature sensor;
activating the first non-empty subset of the power domains for use during a boot sequence;
disabling a second non-empty subset of the power domains, disjoint from the first non-empty subset, during the boot sequence; and executing boot code in the integrated circuit using the clock signal at the first frequency, wherein the first frequency is lower than a second frequency that the integrated circuit is configured to use when executing the boot code at higher temperatures.

9. The method of claim 8, wherein the temperature sensor is integrated with a battery.

10. The method of claim 8, wherein the temperature sensor is inside a camera body with the integrated circuit.

11. The method of claim 8, comprising:
activating a clock gater based on one or more temperature measurements from the temperature sensor.

12. The method of claim 8, comprising:
responsive to the temperature measurement being below the threshold, applying automatic voltage scaling to one or more power domains of the integrated circuit.

13. The method of claim 8, comprising:
running the integrated circuit in an idle mode after completing execution of the boot code, wherein the idle mode includes instructions that cause components to dissipate heat;
comparing one or more temperature measurements from the temperature sensor to a threshold associated with a selected use case; and
responsive to the one or more temperature measurements exceeding the threshold associated with the selected use case, transitioning from the idle mode to an active mode that supports the selected use case.

14. The method of claim 9, wherein accessing the temperature measurement and setting the clock frequency for the clock signal comprise using a microcontroller to access the temperature measurement and set the clock frequency for the clock signal.

15. The method of claim 9, wherein accessing the temperature measurement and setting the clock frequency for the clock signal comprise using the integrated circuit to access the temperature measurement and set the clock frequency for the clock signal during an early phase of a boot sequence for the integrated circuit.

16. A method comprising:
running an integrated circuit in an idle mode after completing execution of boot code, wherein the idle mode includes instructions that cause components to dissipate heat, wherein the integrated circuit includes multiple power domains;
comparing one or more temperature measurements from a temperature sensor to a threshold associated with a selected use case; and
responsive to the one or more temperature measurements exceeding the threshold associated with the selected use case, transitioning from the idle mode to an active mode that supports the selected use case;
selecting a first non-empty subset of the power domains in the integrated circuit for activation based on one or more temperature measurements from the temperature sensor;
activating the first non-empty subset of the power domains for use during a boot sequence; and
disabling a second non-empty subset of the power domains, disjoint from the first non-empty subset, during the boot sequence.

17. The method of claim 16, wherein the temperature sensor is integrated with a battery.

18. The method of claim 16, wherein the temperature sensor is inside a camera body with the integrated circuit.

19. The method of claim 16, comprising:
responsive to a temperature measurement being below a threshold, applying automatic voltage scaling to one or more power domains of the integrated circuit.

20. The method of claim 17, comprising:
activating a clock gater based on one or more temperature measurements from the temperature sensor.

* * * * *